US005482632A

United States Patent [19]
Lomasney et al.

[11] Patent Number: 5,482,632
[45] Date of Patent: Jan. 9, 1996

[54] EXTRACTING A TARGET ION FROM AN AQUEOUS SOLUTION BY ION EXCHANGE AND ELECTROPOTENTIAL ION TRANSPORT

[75] Inventors: Henry L. Lomasney; Richard A. Graves, both of New Orleans, La.

[73] Assignee: Ionex Corporation, New Orleans

[21] Appl. No.: 234,458

[22] Filed: Apr. 28, 1994

[51] Int. Cl.[6] .................................................. B01D 61/48
[52] U.S. Cl. .......................................... 210/638; 210/663
[58] Field of Search ..................... 210/638, 682, 210/748, 243, 663, 670, 644; 204/1.5, 141.5

[56] References Cited

U.S. PATENT DOCUMENTS

| | | |
|---|---|---|
| 2,800,445 | 7/1957 | Clarke et al. . |
| 2,912,372 | 11/1959 | Stoddard et al. . |
| 3,808,305 | 4/1974 | Gregor . |
| 4,978,337 | 12/1990 | Theeuwes ................................. 604/85 |
| 5,004,543 | 4/1991 | Pluskal et al. . |
| 5,078,842 | 1/1992 | Wood et al. . |

OTHER PUBLICATIONS

Harjula et al. "Removal of Cesium From Nuclear Wste Solutions By Potassium Cobalt Hexacyanoferate(II) Columns," *Proc. Sympos. Waste Manage.* 3:93–95 (1987).

*Primary Examiner*—Frank Spear
*Attorney, Agent, or Firm*—Foley & Lardner

[57] ABSTRACT

Processes and apparatuses for separating ions from an aqueous solution are provided which utilize a first separation by an ion exchange medium in combination with second separation by a D.C. electropotential gradient. The first separation separates the target ion by ion exchange and the second separation effects migration of the ions from the ion exchange medium, through a ion permeable, hydrophobic membrane into a second zone, which may contain a buffer. The hydrophobic membrane substantially resists fouling.

20 Claims, 1 Drawing Sheet

EXTRACTING A TARGET ION FROM AN AQUEOUS SOLUTION BY ION EXCHANGE AND ELECTROPOTENTIAL ION TRANSPORT

FIELD OF THE INVENTION

The present invention relates to processes and apparatuses for removing ions such as radionuclides or heavy metals from aqueous liquids such as groundwater, surface streams, acid mine drainage, factory wastewater discharge, etc. More specifically, the processes and apparatuses of this invention utilize a first separation which separates the target ion from the aqueous stream by ion exchange, and a second separation which effects migration of the thus separated ions from the ion exchange medium by means of an electropotential gradient. The ions are driven by means of the gradient through a hydrophobic membrane which substantially resists fouling.

BACKGROUND OF THE INVENTION

There are numerous types of contaminants found in water, including dissolved ionic species. Deionization, also called demineralization or ion-exchange, is the removal of ions and minerals from an aqueous source by means of exchange media which have an affinity for dissolved ionized salts. These media are divided into two classifications, namely cationic media which remove the positive ions and anionic media which remove negative ions. In such media, pendant ionic groups are presented in such a way that: the pendant ions are easily replaced by the ionic species in the aqueous source.

In recent years, the technology of water demineralization has been advanced through use of reverse osmosis membranes, that can provide a medium for separation. Reverse osmosis uses hydraulic pressure to overcome the normal osmotic gradient thus a physiochemical interaction between salt and the membrane cause salts to be rejected and flow to the more concentrated compartment; only water passes through the membrane and into the less concentrated or clean compartment. Although the designs provide for the movement of water through the membrane for flushing of the surface, colloidal species still can provide a fouling problem Electro-dialysis membranes, which also have been recently introduced, provide yet another means for separation of impurities from water. Such membranes rely on electricity to force ions across the membrane, thereby achieving a removal of ionic species from water.

More recently, it has been disclosed that ionic separation procedures may be carried out using a continuous deionized ion exchange bead media in a compartment which is in electrical contact with an ion permeable membrane such as shown in U.S. Pat. No. 5,004,543.

Another example of separation process is provided in U.S. Pat. No. 5,078,842, which discloses separation in an electrochemical cell which contains an ion exchange resin compartment enclosed by a cation permeable membrane. A current is applied externally to the resin chamber by an anode in an anode compartment and a cathode in a cathode compartment. The opposite electrodes to drive the ionically bound ions through the cation permeable membrane and toward the cathode compartment.

All of the foregoing separations suffer from a major limitation, namely, membrane fouling. More specifically, the fouling of water cleaning membranes by colloidal particles is a significant factor that limits operating efficiency in sea water or brackish water desalting, as well as in industrial waste water cleanup. For example, during the operation of an electro-dialysis membrane, the operational efficiency declines as a result of the formation of cake-like layer on the "dirty water" side of the membrane. Similarly, the capacity of ionic separation using the continuous deionized ion exchange bead media is generally limited due to colloidal fouling. Thus, frequent replacement and/or regeneration of the ion permeable membranes is required when any substantial quantity of contaminated aqueous streams are to be cleaned.

Accordingly, there remains a need for new processes and apparatuses which may be used to effect separation of ionic species from aqueous streams.

SUMMARY OF THE INVENTION

It is, therefore, an object of the present invention to provide a process and/or an apparatus for separating a target ion or multiple target ions from an aqueous waste stream, which process and/or apparatus reduces the problem of membrane fouling.

The foregoing objects are achieved, in accordance with one aspect of the invention, by a process for extracting at least one target ion from an aqueous liquid. The process comprises the steps of providing to a first ion exchange zone an aqueous liquid containing a first target ion. The first ion exchange zone comprises both a first ion exchange medium and a first electrode. In the first ion exchange zone, the first target ion is separated by ionic association with a first ion exchange medium. A first ion-depleted aqueous solution results from the separation. A first electropotential force is then used to drive the first target ion from the ion exchange medium into a second zone, which is separated from the first zone by a first hydrophobic barrier. The first hydrophobic barrier is permeable to said first target ion when the ion is being driven by the electropotential force, and is substantially resistant to fouling.

In one advantageous embodiment, the hydrophobic membrane is a microporous polytetrafluoroethylene film such as Tetratex® or Gore Fabric®. In another advantageous embodiment, the hydrophobic barrier further comprises a water swellable polyurethane polymer.

In another embodiment, a pulsed power D.C. electropotential energy source is used as the electropotential force.

Another aspect of the invention provides an apparatus for extracting at least one target ion from an aqueous liquid. The apparatus comprises a first flow cell comprising a first ion exchange zone containing a first electrode and a first ionic exchange medium. The flow cell further comprises a second zone, separated from the first ion exchange zone by a first hydrophobic membrane, as described above. The second zone comprises a second electrode that is of opposite polarity from the first electrode. The first ion exchange medium is positioned between the first and said second electrodes such that the electropotential gradient is in contact with said the ion exchange medium.

In an advantageous embodiment, a second flow cell is provided in which a second ion exchange zone contains an electrode of opposite polarity from that in the first ion exchange zone.

Additional objects and advantages of the invention will be set forth in part in the description that follows, and in part will be obvious from the description, or may be learned by practice of the invention. The objects and the advantages of this invention may be realized and obtained by means of the processes and apparatuses particularly pointed out in the appended claims.

DETAILED DESCRIPTION OF THE PREFERRED EMBODIMENTS

Figure 1:
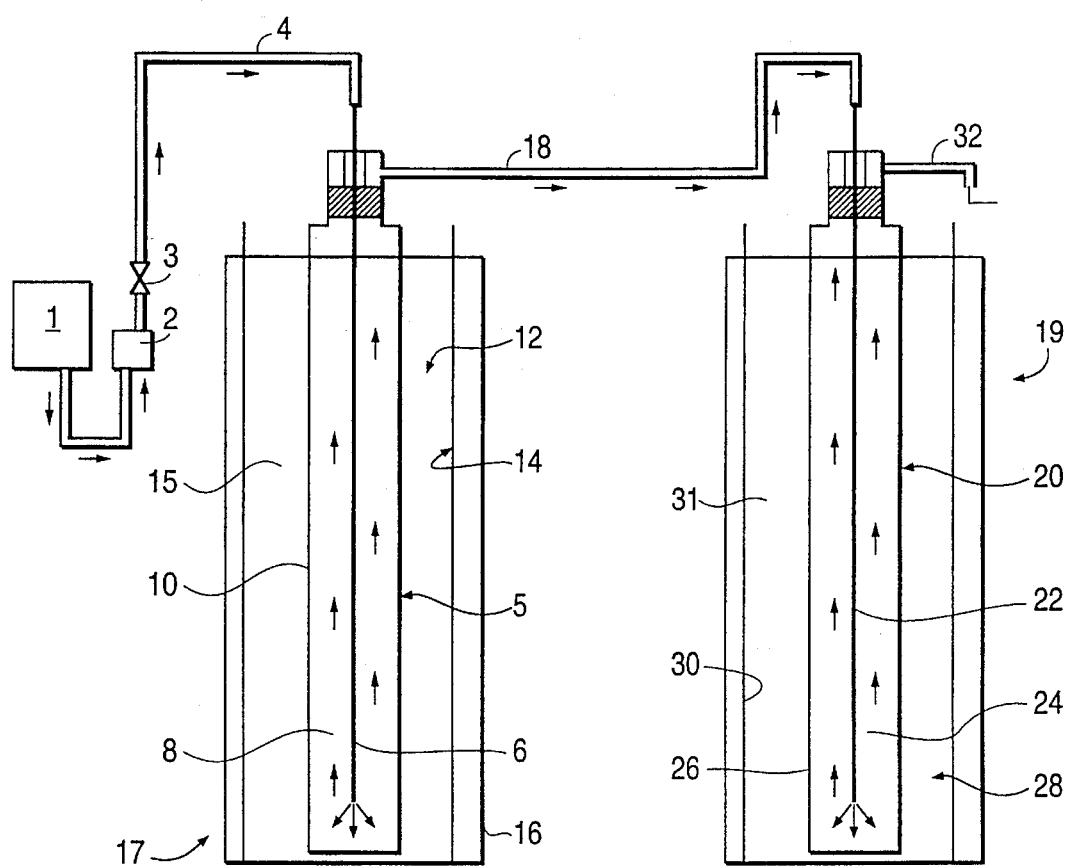
FIG. 1 is a schematic drawing of an apparatus in accordance with this invention.

The present invention provides a method of treating aqueous solutions containing at least one target ion. In basic terms, the processes of this invention generally involve (i) causing ions in the aqueous solution to form an ionic bond to an ionic exchange medium in an ion exchange zone, and (ii) driving the ions adsorbed onto the exchange medium into a second zone by means of an applied electropotential between an electrode in the ion exchange zone and one positioned in the second zone. The second zone is separated from the ion exchange zone by a hydrophobic, ion permeable membrane which substantially resists fouling.

The second zone generally will contain an aqueous liquid suitable for conducting current, for example, an electrode buffer solution. An electrode buffer solution is used to control the hydrogen ions generated by the oxidation of water at the anode and/or hydroxyl ion generated by the reduction of water at the cathode. An electrode buffer solution may be utilized to perform other functions such as selective precipitation of ions or electrode conditioning. A electrode buffer solution also may be present in the first zone.

Typical electrolytes which may be utilized as cathode buffer solutions include hydrochloric acid solution, nitric acid solution, sulfuric acid solution, citric acid solution, DTPA solution, and boric acid solution.

Typical anode buffer solutions include sodium hydroxide solutions potassium hydroxide solution, calcium hydroxide slurry, polyethylene imine solution, tri-sodium phosphate solution, and ammonium hydroxide solution.

The ion exchange zones of the invention generally will be defined, discrete chambers which are defined by a hydrophobic, ion permeable membrane. The combination of an ion exchange zone and a second zone separated from the ion exchange zone by the membrane will be referred to generally as a flow cell. The ion exchange zone will contain both an electrode and ion exchange medium. Electrodes are well known in the art and the choice of electrode will depend upon factors well known to skilled artisans.

The rate of removal of the ionic species from the ion exchange zone will depend in part upon the transport of the contaminant species across the ion exchange material and in part upon the transport of $H^+$ and $OH^-$ ions across the bed. The target ions captured non-covalently on the exchange medium will be moved toward the oppositely charged electrode as dictated by the D.C. potential. In one embodiment of this invention, a pulsed power D.C. electropotential energy source is provided. The amount of current selected will be determined by the contaminant content of the water stream, with currents in the range of 10 to about 100 amps being common.

The ion exchange medium generally will comprise small diameter particles, typically spherical. Typical organic polymer ion exchange particles are available in sizes ranging from 16 mesh to about 200 mesh. Other types of ion exchange media, however, are contemplated.

The selection of an ion exchange medium is well within the skill of the art, as such media are well known. The ion exchange medium selected will, of course, depend upon the target ions. For example, inorganic media can be chosen to selectively exchange ions with specific target ions. One candidate medium is common silica sand, optionally the silica sand can be treated with a metal oxide coating which will enhance the surface ion capture kinetics.

Optionally, an organic resin possessing the desired selectivity and ionic capture properties can be incorporated. Resins having weak acid or weak base functional groups may be very specific and could selectively remove various target ions.

An example of organic polymer materials functioning as cation exchangers are the styrene di-vinyl benzene matrix polymers incorporating sulfonate end groups. Anion exchangers typically include a quaternary ammonium site normally coupled with an amine moiety.

There are many ion exchange compositions that satisfy the desired characteristics and function well in a diffusion uptake regimen. For example, early sulfonic resins based on a cross-linked phenolic matrix have been utilized as diffusion-type ion exchange compositions. These resins can be prepared either by sulfonation of phenol-formaldehyde polymers (Amberlite IR-100), by condensation of phenol-sulfonic acid with formaldehyde (Dowex 30), or by alkaline condensation of sodium phenoxide, sodium sulfite, and formaldehyde (Amberlite IR-1).

Another class of diffusion-type ion exchange media is the strong-acid resins which are typically sulfonated styrene-divinylbenzene copolymer products (Amberlite IR-120, Amberlite IR-200, Dowex 50, Dowex 50W, Dowex MPC-1, Duolite C-20, Duolite C-25, Ionac C-240, and Ionac C-250). All are spherical products prepared by sulfonation of styrenedivinylbenzene copolymer beads with a sulfonating agent.

Another class of ion exchange media, the weak acid resins, are typified by the presence of functional groups consisting of phenolic, phosphorous, $RP(OH)2$, or carboxylic entities. They can be prepared by cross-linking an unsaturated carboxylic acid such as acrylic, methacrylic or maleic with a cross-linking agent such as divinylbenzene or ethylene dimethacrylate. A large number of these structures have been prepared in the laboratory using various tertiary amines. Popular commercial materials are Amberlite IRA-400 series, Duolite A-101 series, Dowex and Ionac A-540.

Another category of diffusion-type ion exchanger is the strong base anion-exchange resins. These are prepared from the reaction of chloromethylated beads with a dialkyl sulfide such as dimethyl sulfide to produce a disulfonium compound. This is contrasted with the weak base anion-exchange resins which contain primary, secondary, and/or tertiary amine groups, generally a mixture of these. A wide variety of products are available, generally condensation products of aliphatic polyamines with formaldehyde or with alkyl dihalides, such as ethylene dichloride, or with epichlorohydrin.

"Snake-cage" polyelectrolytes are known and have been developed for specific purposes; they consist of a cross-linked polymer system ("cage"), containing a physically trapped linear polymer ("snake"). These are physically constrained mixtures of polymers. The cage polymer restricts the freedom of kinetic motion of the snake polymer. An example is: Retardion 11A8 (The Dow Chemical Co.).

Certain of these structures are useful for specific ions. A good example of this is the unusual affinity for cesium exhibited by dipotassium cobalt(II)' precipitated in the form hexacyanoferrate(II), $K_2CoFe(CN)_6$ of reasonably sized granules. (R. Harjula et al., University of Helsinki, Union Inkatu, 35, Helsinki, Finland, "Removal of Cesium from Nuclear Waste Solutions . . . " 1985) In more recent work, attention has been focused on optimizing ion transport through polymeric media. The structure and porosity of an ion exchange resin are determined principally by the conditions of polymerization of the base ("backbone") polymer, to which the ionic sites are pendant as mentioned above, to polyelectrolyte materials which are immobilized within a matrix.

Polymers prepared in the presence of major amounts of nonpolymerizable diluents were reported by U.S. Pat. No. 2,800,445 to Clarke. Macroporous ion exchange resins (sometimes referred to as "macroreticular" or "isoporous") have been prominent since about 1960. For example, in U.S. Pat. No. 3,808,305, Gregor discloses such a matrix polymer, a polyelectrolyte and a cross-linker to achieve desired pore size. Such resins have pores of a considerably larger size than those of the more conventional gel-type resin.

Typical matrix polymers have heretofore been vinyl halides, styrene or acrylic. The polyelectrolyte can be polystyrene sulfonic acid or poly acrylic acid (MW 4000) or onium class (Quaternary Ammonium Groups).

Alternatively, one can use an ion exchange cloth similar to that commercially available from Carborundum Corporation under the designation of "Ion Exchange Cloths and Felts" or ion exchange products marketed by Scott Paper Company under the designation "Industrial Foam Ion Exchanger." Such ion exchange cloths or foams can be used alone or as a single element of a multi-element composite. Cellulose fabrics and similar ion exchange media also can be used.

As stated above, the ion exchange medium is in a ion exchange zone, which is separated by a hydrophobic, ion permeable membrane from a second zone, which ultimately receives the target ion. Skilled artisans will readily appreciate the membranes which can be used in accordance with this invention to separate the zone which ion exchange media from the zone which does not. Advantageously, the membrane is a water impermeable, low surface energy, ion-porous film such as a polytetrafluoroethylene film (PTFE-commonly known as Teflon® or Fluon®, marketed as Tetratex® or Gore Fabric®). It has been discovered that the use of such a material substantially resists fouling of the system by colloidal materials and suspended organic materials including those commonly associated with soils.

The term "substantially resists fouling" or the like means that the membrane substantially resists significant deterioration of operating efficiency due to the obstruction or blockage of foreign substances carried by the aqueous solutions. The operating efficiency includes the efficiency with which ions can pass through the membrane when being driven by the electropotential force. The term does not mean that the membrane will never foul, but rather that over an extended period of time the membrane will substantially resist fouling from colloidal materials and suspended organic materials including those commonly associated with soils. Further, it is believed that the use of pulsed D.C. power, as discussed above, can substantially reduce the fouling which otherwise would occur with hydrophobic membranes that are permeable to ions being driven by an electropotential force.

Advantageously, the hydrophobic, ion permeable membrane further comprises a thin layer of ion permeable material which coats the membrane, and further reduces fouling. Such material advantageously is a highly elastomeric composite such as a polyurethane/polyol copolymer, for example, Scotch-Seal Chemical Grout 5610, manufactured by 3M Corporation, or a water soluble polyacrylamide Cyanagel 2000, manufactured by American Cyanamid Company. The material is advantageously applied to the inside of the ion exchange zone in a thickness ranging from about 1 mm to about 30 cm with a preferable thickness of from about 5 to about 20 cm.

In another embodiment of this invention, the aqueous solution which is present in a flow cell for a time sufficient to permit ion exchange by the ion exchange medium therein is taken via a conduit to another such flow cell containing the same or different medium, where a further separation is carried out. Advantageously, the electrodes in the ion exchange zones of the different flow cells are oppositely charged, thereby enabling ions of one charge to be separated in the ion exchange zone of the first flow cell and oppositely charged ions to be exchanged in the second ion exchange zone.

The process of the invention will now be described with reference to the figure, which should be understood to be simply an illustration and not a limitation of the invention.

Referring now to FIG. 1, an aqueous solution containing the target ions is supplied by source 1 through pump 2, valve 3 and conduit 4 into a first ion exchange zone 5. Ion exchange zone 5 contains an anode 6, ion exchange medium 8 and hydrophobic, ion permeable membrane 10. The second zone 12 contains a cathode 14, a buffer 15 and an outer wall 16. The combination of the first ion exchange zone and the second zone is a first flow cell 17. The first flow cell 17 is connected by conduit 18 to a second flow cell 19 which contains a second ion exchange zone 20, cathode 22 and ion exchange medium 24. The hydrophobic, ion permeable membrane 26 separates the second ion exchange zone 20 from another zone 28 which contains an anode 30 and buffer 31. Conduit 32 is provided for an exit stream.

In the process of this invention, an aqueous solution containing a negatively charged target ion enters the ion exchange zone 5 of the first flow cell where the ion is extracted by the exchange medium 8. The current generated by anode 6 and cathode 14 then causes the target ion to migrate through the membrane 10 and into the second zone 12. The ion-depleted solution is then taken out through conduit 18 and supplied to the second ion exchange zone 20 in the second flow cell 19. In the second ion exchange zone 20, positively charged ions are exchanged with the medium 24 and then moved across the membrane 26 into zone 28 by the current between electrodes 22 and 30. The further ion-depleted stream is taken off through conduit 32.

The following examples serve merely to illustrate and not to limit the invention.

EXAMPLE NO. 1

This test demonstrated continuous electrokinetic cleanup of water. The test was carried out using a flow cell similar to FIG. 1. It incorporated a Tectron Model T-700133 cylinder pair of approximately 47 mm in overall length, anode cylinder fitted with anion permeable membrane, and cathode cylinder fitted with cation permeable membrane. A working solution of contaminated groundwater (simulant) was prepared containing 22,000 ppm sodium ion. The operating voltage was 13 volts D.C. which converts to 2 volts per cm across the ion exchange bed. (Current was allowed to vary during this test.) The cell was operated in a recirculation mode for 24 hours. During this time 98% of the sodium was removed from the test solution and was collected in the electrode compartment.

The test was continued to an ultimate duration of 105 hours. After 105 hours operation, the test solution was analyzed with atomic adsorption equipment and found to be 99.97% purity. This is substantially below the water purity criteria for potable water. Operating efficiency of this cell was observed to be highest when the test solution was highly concentrated. Conversely, the operating efficiency was poorest, as the test solution was progressively purified. This permits the conclusion that this cell will provide an efficient mechanism for cleanup of highly contaminated solutions such as acidmine drainage, especially when acceptable cleanup criteria would be comparable to potable water.

EXAMPLE NO. 2

A copper extraction demonstration was carried out as follows: The test cell was similar to Example No. 1. The anode chamber was filled with strong base anion exchange beads. The cathode chamber was filled with strong acid ion exchange media. Two D.C. power supplies were used, each capable of 20 volts D.C. and 3 amperes. A peristaltic pump was used to deliver the 75 ppm copper nitrate ladened simulant solution to the series connected cells, at a rate of 1 gallon per hour. The one gallon solution was circulated through the cells over a one hour interval. Three passes through the cell pair resulted in a final copper concentration of 1.5 ppm in the working solution.

EXAMPLE NO. 3

A cyanide removal demonstration was carried out with the same test setup as was used in Examples No. 1 and No. 2, except that only the anode cell was used. Strong base type anion exchange beads were used. The flow rate was one gallon per hour. The starting concentration was 7 ppm cyanide (in simulant working solution). After a first pass through the cell, the cyanide concentration in the test solution was reduced to 220 ppb and after two passes, the concentration was 20 ppb.

In Example No. 1 above, the total mass of sodium ion in the working solution was more than two times the total bead capacity. In Example Nos. 2 and 3, the bead resin was fully exhausted prior to starting the test. These conditions were necessary to permit the conclusion that electrokinetic mobilization of the ionic species was responsible for the removal, as opposed to an ion exchange capture by the active bead resin.

In Examples No. 1 and No. 2, the presence of membrane fouling was noted during the test runs. This fouling was in the form of metal and metal oxide deposits on the internal surface of the membrane.

EXAMPLE NO. 4

A copper removal experiment was carried out using a horizontal cylinder flow cell. This cell consists of a cylindrical vessel fabricated from acrylic, and configured with a porous teflon barrier membrane (Gore Fabric®) which divided the two electrode compartments. One compartment was filled with ion exchange media. The working solution was pumped through the ion exchange media compartment where it contacted the ion exchange media and surrendered the ionic species. The D.C. current thus carried on the surface of the bead media and the $H^+$ and $OH^-$ ions which result from electrolysis of water provide the ion transport mechanism which continuously restores the active surface of the ion exchange media while moving the captured ions into the collection compartment.

The cell was operated at working solution flow rates up to one liter per minute. The initial copper ion concentration was 75 ppm. Upon leaving the cell, the copper concentration was less than one ppm. In this operation, the porous teflon barrier membrane showed no indication of colloidal fouling, even after several hours of operation.

It will be apparent to those skilled in the art that various modifications and variations can be made to the apparatuses and processes of this invention. Thus, it is intended that the present invention cover the modifications and variations provided they come within the scope of the appended claims and their equivalents.

What is claimed is:

1. A process for extracting at least one target ion from an aqueous solution, comprising:

A. introducing an aqueous solution containing at least one target ion to a first ion exchange zone containing a first electrode and a first ion exchange medium;

B. separating, in said first ion exchange zone, said target ion from said aqueous solution by ionic association with said first ion exchange medium to yield a first ion-depleted aqueous solution; and C. driving said first target ion from said first ion exchange medium into a second zone which contains a second electrode and an electrode buffer solution by means of a first electropotential force between said first and second electrodes, wherein said second zone is separated from said first ion exchange zone by a first hydrophobic barrier which substantially resists fouling, which is permeable to said first target ion when said ion is being driven by said electropotential force and which is water impermeable.

2. A process according to claim 1, wherein said first ion exchange medium comprises a metal oxide coated silica or an organic polymer.

3. A process according to claim 1, wherein said first hydrophobic barrier comprises polytetrafluroethylene.

4. A process according to claim 3, wherein said first hydrophobic barrier further comprises a water swellable polyurethane polymer.

5. A process according to claim 1, wherein said first hydrophobic barrier comprises a water swellable polyurethane polymer.

6. A process according to claim 1, wherein said electropotential force comprises a pulsed D.C. electropotential force.

7. A process according to claim 1, further comprising the steps of:

D. removing said first ion-depleted aqueous solution from said first ion exchange zone and introducing said first ion-depleted aqueous solution to a second ion exchange zone comprising a second ion exchange medium and a third electrode;

E. separating, in said second ion exchange zone, a second target ion from said first ion-depleted aqueous solution by ionic association with said second ion exchange medium to yield a second ion-depleted aqueous solution; and F. driving said second target ion from said second ion exchange medium into a fourth zone which contains a fourth electrode by means of a second electropotential force between said third and fourth electrodes, wherein said fourth zone is separated from said second ion exchange zone by a second hydrophobic barrier that substantially resists fouling, is permeable to said second target ion when said second target ion is being driven by said second electropotential force and which is water impermeable.

8. A process according to claim 1, wherein said aqueous solution is selected from the group consisting of ground water, surface streams, acid mine drainage, and factory waste water discharge.

9. An apparatus providing means for extracting at least one target ion from an aqueous solution, comprising:

a first flow cell comprising a first ion exchange zone and a second zone, wherein:

said first ion exchange zone comprises a first electrode and a first ion exchange medium; and said second zone is separated from said first ion exchange zone by a first hydrophobic membrane and comprises a second electrode and an electrode buffer solution;

said first ion exchange medium is positioned between said first and said second electrodes such that an electropotential force created between said first and second electrodes will be in contact with said first ion exchange medium, and said hydrophobic membrane is permeable to said first target ion when said ion is being driven by the electropotential force, substantially resists fouling, and is water impermeable.

10. An apparatus according to claim 9, wherein said first ion exchange medium comprises a metal oxide coated silica or an organic polymer.

11. An apparatus according to claim 9, wherein said first fouling resistant hydrophobic barrier comprises polytetrafluroethylene.

12. An apparatus according to claim 11, wherein said fouling resistant hydrophobic barrier comprises a water swellable polyurethane polymer.

13. An apparatus according to claim 9, wherein said first fouling resistant hydrophobic barrier comprises a water swellable polyurethane polymer.

14. An apparatus according to claim 9, further comprising a D.C. power source connected to said first and second electrode.

15. An apparatus according to claim 14, wherein said D.C. power source provides pulsed D.C. power.

16. An apparatus according to claim 9, further comprising:

a second flow cell comprising a second ion exchange zone and a fourth zone, and a conduit between said first ion exchange zone of said first flow cell and said second ion exchange zone of said second flow cell for the passage of aqueous solution therebetween, wherein:

said second ion exchange zone comprises a third electrode and a second ionic exchange medium;

said fourth zone is separated from said second ion exchange zone by a second hydrophobic membrane and comprises a fourth electrode;

said second ion exchange medium is positioned between said third and said fourth electrodes such that an electropotential force created between said third and fourth electrodes will be in contact with said second ion exchange medium, and said second hydrophobic membrane is permeable to said second target ion when said second target ion is being driven by an electropotential force created between said third and fourth electrodes, substantially resists fouling, and is water impermeable.

17. A process for extracting at least one target ion from an aqueous solution, comprising:

A. introducing an aqueous solution containing at least one target ion to a first ion exchange zone containing a first electrode and a first ion exchange medium;

B. separating, in said first ion exchange zone, said target ion from said aqueous solution by ionic association with said first ion exchange medium to yield a first ion-depleted aqueous solution; and C. driving said first target ion from said first ion exchange medium into a second zone which contains a second electrode and an electrode buffer solution by means of a first electropotential force between said first and second electrodes, wherein said second zone is separated from said first ion exchange zone by a first hydrophobic barrier which is permeable to said first target ion when said ion is being driven by said electropotential force and is water impermeable, and wherein said electropotential force comprises a pulsed D.C. electropotential force.

18. A process according to claim 17, wherein said first hydrophobic barrier comprises polytetrafluroethylene.

19. A process according to claim 18, wherein said first hydrophobic barrier further comprises a water swellable polyurethane polymer.

20. A process according to claim 17, wherein said first hydrophobic barrier comprises a water swellable polyurethane polymer.

* * * * *